US006305162B1

(12) United States Patent
Cobo et al.

(10) Patent No.: US 6,305,162 B1
(45) Date of Patent: Oct. 23, 2001

(54) METHOD AND APPARATUS FOR CONTROLLING THE DEADBAND OF A FLUID SYSTEM

(75) Inventors: Michael A. Cobo, Saint Charles; Hans P. Dietz, Naperville; William N. O'Neill, East Peoria; Brett J. Janson, Dunlap, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/282,339

(22) Filed: Mar. 31, 1999

(51) Int. Cl.$^{7}$ .................................................... F16D 31/02
(52) U.S. Cl. ............................................ 60/422; 60/431
(58) Field of Search ............................. 60/422, 431, 463

(56) References Cited

U.S. PATENT DOCUMENTS

| | | | |
|---|---|---|---|
| 3,821,625 | 6/1974 | Scholl . | |
| 4,846,233 | 7/1989 | Fockens | 141/94 |
| 4,960,568 | 10/1990 | Matsumoto et al. | 422/83 |
| 5,737,993 | 4/1998 | Cobo et al. | 91/361 |
| 5,784,945 * | 7/1998 | Krone et al. | 91/361 |
| 5,848,609 | 12/1998 | Marchesseault | 137/624.11 |

FOREIGN PATENT DOCUMENTS

| | | |
|---|---|---|
| 198 39 062 A 1 | 3/1999 | (DE) . |
| 2 291 987 A | 2/1996 | (GB) . |

* cited by examiner

*Primary Examiner*—Edward K. Look
*Assistant Examiner*—Thomas E. Lazo
(74) *Attorney, Agent, or Firm*—W. Bryan McPherson III

(57) ABSTRACT

The present invention provides a method and apparatus for controlling a fluid system. The fluid system includes a hydraulic circuit having a pump driven by an engine. The pump delivers fluid to an actuator through a valve assembly. The method includes the steps of receiving an operator input, determining a condition of the hydraulic circuit, determining a valve command in response to the circuit condition and the operator input, and delivering the valve command to the valve assembly.

17 Claims, 6 Drawing Sheets

12
18
45
46
48
120
126
104
16
44
122
124
22
19
32
112
106
20
28
30
102

METHOD AND APPARATUS FOR CONTROLLING THE DEADBAND OF A FLUID SYSTEM

TECHNICAL FIELD

This invention relates generally to a fluid system, and more particularly, to a method and apparatus for controlling a deadband of a fluid system.

BACKGROUND ART

Fluid control systems located on earth moving machines, include an operator interface for enabling the operator to control the fluid system, and a hydraulic circuit for controlling the work implements of the machine in response to the operator's inputs. The operator interface may include joysticks adapted to receive the operator inputs and generate the appropriate input signals to control the fluid system. A controller receives the inputs signals and determines the appropriate valve commands. The valve commands are delivered to a valve assembly, or control valve, which controls the fluid flow from a pump to an actuator. In one embodiment, the valve assembly includes a pilot valve and a main valve. An implement of an earth moving machine is connected to one or more actuators. In addition, the pump is driven by a pump engine.

The controller determines a valve command, in response to the operator input signal, and associated hydraulic circuit signals such as the signal received from an engine speed sensor. The valve command signal is then delivered to the appropriate valve assembly. In one embodiment, the valve command signal is delivered to the solenoid of the pilot valve located within the valve assembly. The solenoid is then energized, and controls the valve spool within the pilot valve, to achieve an appropriate position in response to the valve command signal. The pilot valve, then responsively delivers a pilot pressure to the main valve in order to move the main valve, or the spool within the main valve, to the desired position. The main valve then enables fluid to be delivered to the actuator.

In a fluid control system there is a deadband associated with the movement of the joystick from a neutral position, to a position where an initial movement of the actuator being controlled occurs. This deadband may be referred to as a first motion deadband. The deadband may be associated, in part, with the change in valve position needed in order to provide an appropriate amount of fluid flow to the actuator in order to get the actuator to move.

The responsiveness of the actuator is dependent, in part, on the fluid pressure, and fluid flow rate delivered to the actuator. The fluid pressure and fluid rate are in turn dependent, in part, on the main valve position, engine speed, and pump displacement.

The first motion deadband is due, in part, to the amount the main valve needs to move before the main valve enables the appropriate fluid to flow to the actuator. This deadband, between the initial position of the joystick and the position of the joystick where the initial movement of the actuator occurs, is consistent for a given engine speed, pump displacement, and load. However, if the pump engine speed is reduced, for example from a high idle to a low idle speed, then the same joystick command at the high idle speed will not cause the same response of the actuator at the low idle speed. Therefore, the joystick command will need to be increased, for example, as the engine speed is reduced, in order to provide enough fluid flow to the actuator to achieve the same actuator response as in the high idle condition.

Therefore, the first motion deadband varies, in part, on the engine speed and pump displacement of the hydraulic circuit. Variations in first motion deadband result is an inconsistent operator interface which reduces the efficiency of the operator and may lead to errors in the operation of the machine.

The present invention is directed to overcoming one or more of the problems identified above.

DISCLOSURE OF THE INVENTION

In one aspect of the present invention, a method for controlling a fluid system is disclosed. The fluid system includes a hydraulic circuit having a pump driven by an engine. The pump delivers fluid to an actuator through a valve assembly. The method includes the steps of receiving an operator input, determining a condition of the hydraulic circuit, determining a valve command in response to the circuit condition and the operator input, and delivering the valve command to the valve assembly.

In yet another aspect of the present invention, a method for controlling a fluid system is disclosed. The system includes a hydraulic circuit having a pump driven by an engine. The pump delivers fluid to an actuator through a valve assembly. The method includes the steps of establishing a first motion deadband, receiving an operator input, determining an engine speed, determining a valve command in response to the engine speed and the operator input.

In yet another aspect of the present invention, an apparatus to control a fluid system is disclosed. The fluid system includes a hydraulic circuit having a pump driven by an engine. The pump delivers fluid to an actuator through a valve assembly. The apparatus comprises an input controller adapted to receive an operator input and responsively generate an input signal, an engine speed sensor adapted to sense a speed of the engine and responsively generate an engine speed signal, and a controller adapted to receive the input signal and the speed signal, determine a valve command in response to the input signal and the speed signal, and deliver the valve command to the valve assembly.

BEST MODE FOR CARRYING OUT THE INVENTION

Figure 1:
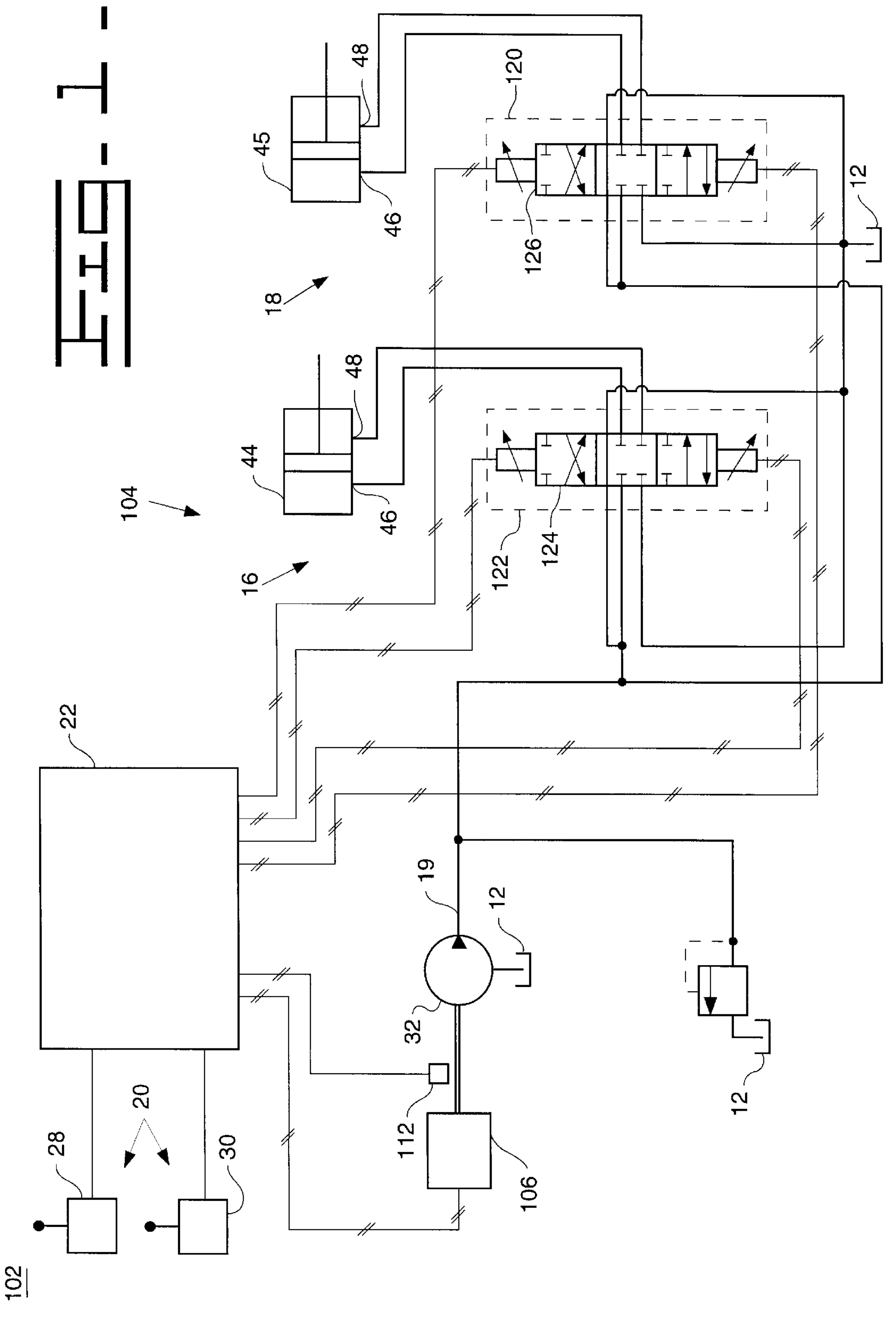
FIG. 1 is a high level diagram of one embodiment of a fluid system.

The present invention provides an apparatus and a method for controlling a fluid system. FIG. 1 is an illustration of one embodiment of a fluid system 102, which includes a hydraulic circuit 104. In the preferred embodiment, the fluid system 102 is a hydraulic system. The hydraulic system 102 includes a reservoir, or tank 12, a source of pressurized fluid 32, and a pump engine 106 connected to the fluid source 32. The source of pressurized fluid 32 of the subject embodiment may be either a fixed displacement pump 32, or a variable displacement pump (not shown). The system 102 may include a first and second actuator circuit 16,18 connected in parallel to the pump 32 by a fluid conduit 19, an input controller 20, an electrical controller 22, such as a microprocessor, connected to the input controller 20, and an electrohydraulic fluid flow control mechanism 24 (not shown).

The input controller 20 includes first and second control lever mechanisms 28,30, e.g., joysticks, that are each connected to the electrical controller 22 and operative to output an electrical signal to the electrical controller 22 proportional to an input from an operator.

Each of the first and second actuator circuits 16,18 are the same and each includes an actuator 44,45 having first and second fluid ports 46,48. Therefore, the description with respect to the first actuator circuit 16 will also describe the second actuator circuit 18. In one embodiment, the first actuator circuit 16 also includes a valve assembly, or control valve 122. In the preferred embodiment, the valve assembly 122, 120 includes an open centered valve 124, 126. However, as will be described below, other types of valves may be used in the valve assembly 120, 122.

The system 102 includes a speed sensor 112 adapted to determine the speed of the pump engine 106. The engine speed sensor 112 delivers a sensed speed signal to the controller 22. In one embodiment, the speed sensor 106 is a device sensitive to the passing of gear teeth by a magnetic pickup mounted to the engine 32, as is well known in the art.

The system 102 may include at least one position sensor (not shown) adapted to determine the position of an actuator 44, 45. The position sensor delivers a position signal to the controller 22.

The controller 22 receives inputs from the joysticks 28, 30, and the speed sensor 112, and responsively controls the motion of the actuators 44, 45 by providing the appropriate valve position commands, i.e., command signals, to the control valves 120, 122.

While FIG. 1 illustrates one embodiment of a fluid system 102, other embodiments of the fluid system, including, hydraulic circuits, valve assemblies, and relief pressure systems may be used without deviating from the essence of the present invention.

One of the objects of the present invention is to maintain a consistent first motion deadband in order to provide a consistent control interface to the operator of the machine, regardless of the fluid flow rate, engine speed or pump displacement. The first motion of an actuator 44, 45 may be described as occurring when the actuating force of the actuator 44, 45, i.e., the pressure times the area, is greater than the opposing force. The first motion deadband may be described as the deadband associated with the movement of the joystick 28, 30 from a neutral position, to a position where a first motion, or initial movement, of the actuator 44, 45 being controlled occurs. That is, the amount of travel of the joystick 28 needed before the actuator 44, 45 begins to respond. For example, if the first movement of the actuator 44 occurs when the joystick 28 is located at a position of three degrees from neutral, or a three degree deflection, then the first motion deadband may be considered to be three degrees. However, if the engine speed is reduced, for example from 2100 rpm to 1000 rpm, then it may take a ten degree joystick deflection before the initial actuator 44 movement occurs. The joystick position variation, or increased deadband, is due, in part to the general characteristic that as the fluid flow rate is reduced by the engine speed reduction, a larger valve position, from pump to actuator, is needed to enable more fluid flow to the actuator. The larger valve position is needed to offset the effect of the reduced engine speed. Therefore the joystick 28, 30 is moved further in order to achieve an adequate valve command, and associated fluid flow, to cause the first motion of the actuator 44, 45. Therefore, the first motion deadband, in this example, has increased from three to ten degrees.

Figure 2:
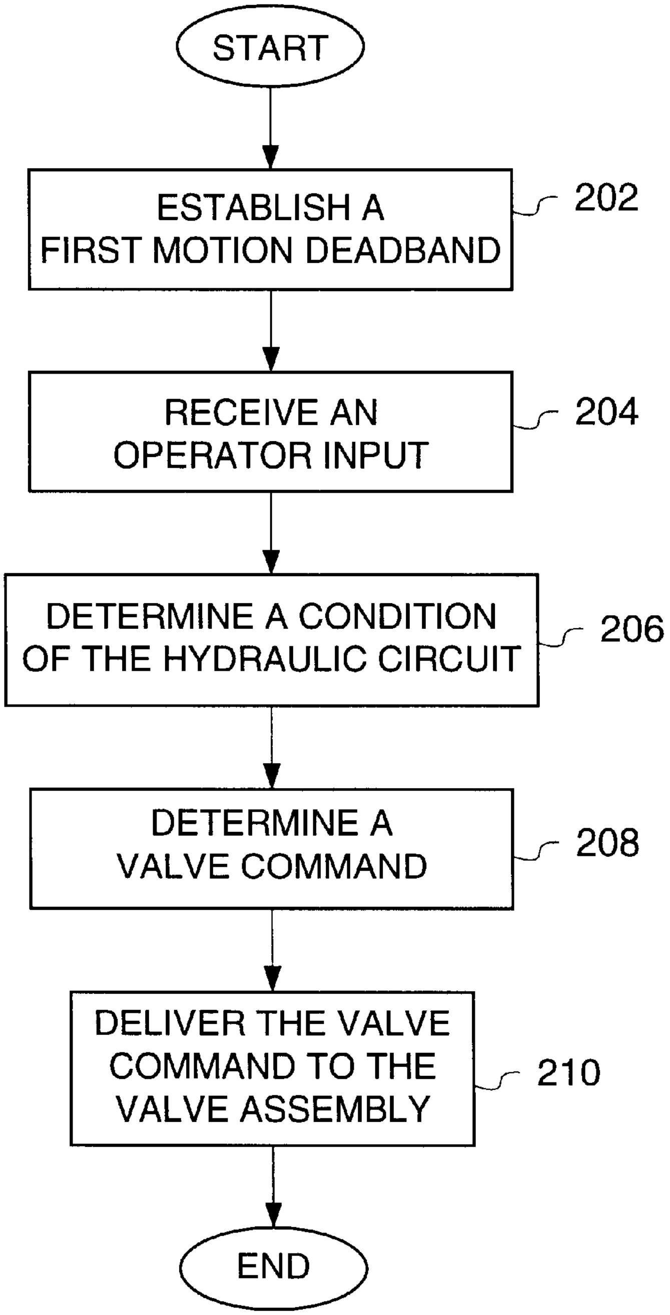
FIG. 2 is an illustration of one method for controlling a fluid system.

FIG. 2 illustrates one embodiment of a method of controlling a fluid system 102. The method includes the steps of establishing a first motion deadband, receiving an operator input, determining a condition of the hydraulic circuit, determining a valve command, and delivering the valve command to the valve assembly.

In a first control block 202 a first motion deadband is established, or calibrated. In one embodiment, the first motion deadband of a system 102 may be emperically determined. For example, the engine speed may be set to high idle (e.g., 2100 r.p.m.), and the pump displacement maintained at a maximum displacement. Therefore, the conditions of the hydraulic circuit 104 such as engine speed, pump displacement, and fluid flow rate may be maintained at a steady value. An actuator 44, 45 is then commanded to move. In one embodiment, a joystick 28, 30 is moved from a neutral position, for example, to a first position commanding an extension of an actuator 44. The joystick command is delivered to controller 22. The controller 22 determines and delivers a corresponding valve command to the valve assembly 122, which enables the valve 124, 126 to move to the appropriate position. The range between the initial joystick position and the position of the joystick where the first actuator motion occurs, e.g., three degrees, may be referred to as a calibrated, or established, first motion deadband.

Figure 3:
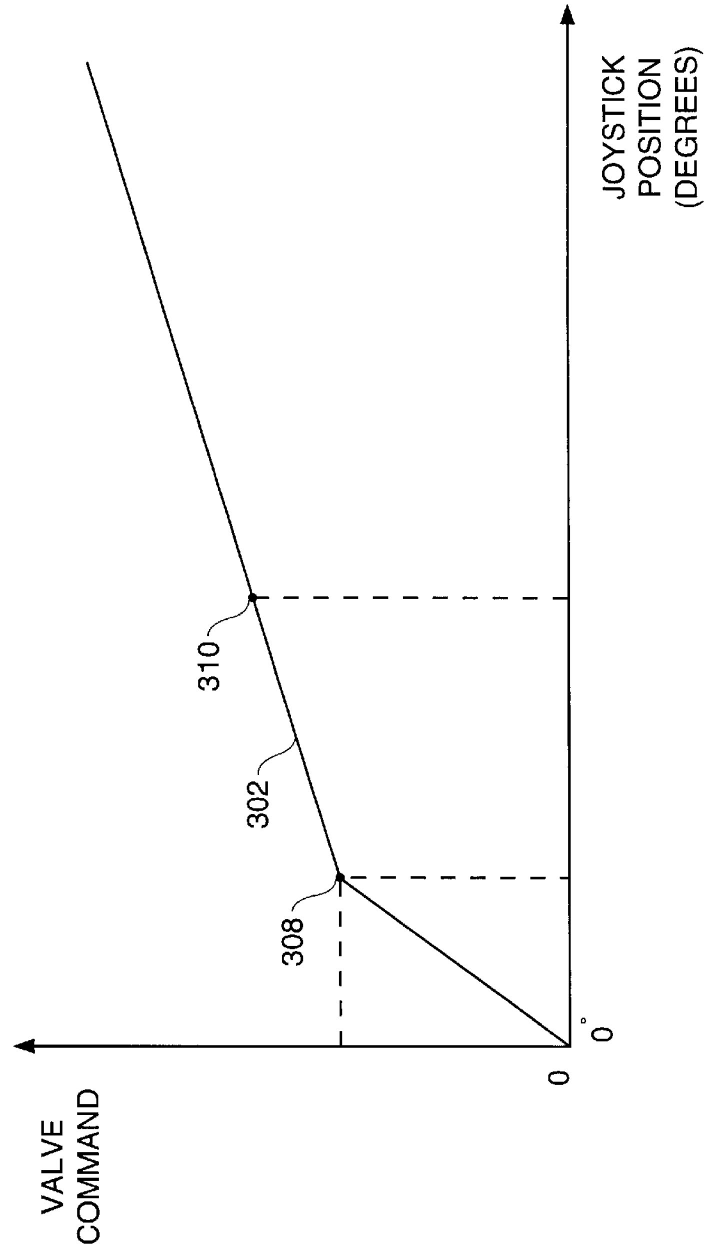
FIG. 3 is a graph of command curve as a function of joystick input, and valve command.

FIG. 3 illustrates a command curve 302 resulting in a calibrated, or established, first motion deadband 308 as a function of the joystick input and the valve command delivered to the valve assembly 120, 122. The resulting command curve 302 may be referred to as a calibrated command curve. In one embodiment, the calibrated command curve 302 may be established by determining a desired first motion deadband, e.g., three degrees. Then, through empirical analysis, the valve command may be calibrated to deliver the appropriate current to the valve 120, 122 so that the valve 120, 122 will achieve the appropriate position, at a three degree joystick deflection, to cause first motion of the cylinder 44, 45 at the given engine speed and pump displacement. In the preferred embodiment, the first motion of the actuator may be visually detected by seeing the appropriate work implement (not shown) or actuator 44 move. Alternatively, position sensors adapted to sense the position of the actuator may be used to detect the motion and position of the actuator 44.

The calibrated curve 302 and associated joystick positions and valve commands may be stored in a table, in memory, and referred to as a calibrated command table. The calibrated command table may be used in a manner such that a joystick input may be compared to the calibrated table to determine the appropriate valve command. When the conditions of the hydraulic circuit 104 are the same as when the calibrated table was determined, the first motion deadband should be the same.

In a second control block 204, during the operation of the machine 102, an operator input is received by the controller

22. In the preferred embodiment, the command is received from a joystick 28, 30, in response to an operator manipulating the joystick 28, 30.

In a third control block, a condition of the hydraulic circuit 104 located in the fluid system 102 is determined. In the preferred embodiment the condition includes the engine speed and the pump displacement. The pump displacement may be determined be determining the speed of the engine 32 driving the pump. In an alternative embodiment, the condition may include the fluid flow rate and/or the work function the machine is performing. Examples of work functions include blade raise, blade lower, rack, and dump functions, and will be discussed further below. In one embodiment, the conditions of the hydraulic circuit 104 may be continuously monitored and available when an operator input is received.

In a fourth control block 208, a valve command is determined in response to the hydraulic circuit condition and the operator input. The command is determined such that the resulting first motion deadband is consistent with the established first motion deadband. That is, for example, even though the engine speed, and/or pump displacement may have changed, the first motion deadband is the same, or within a small threshold of the established first motion deadband.

If the present invention is not used, then, when the engine speed changes the first motion deadband also changes. For example, using a calibrated command curve 302 which, for example, was calibrated with the pump engine at high idle and the pump at maximum displacement a determined first motion deadband 310 at a reduced engine speed, will be greater than the established, or calibrated, first motion deadband 308. The valve command determined by the present invention is determined accordingly in order for the determined first motion deadband to be consistent with the established first motion deadband.

Figure 4:
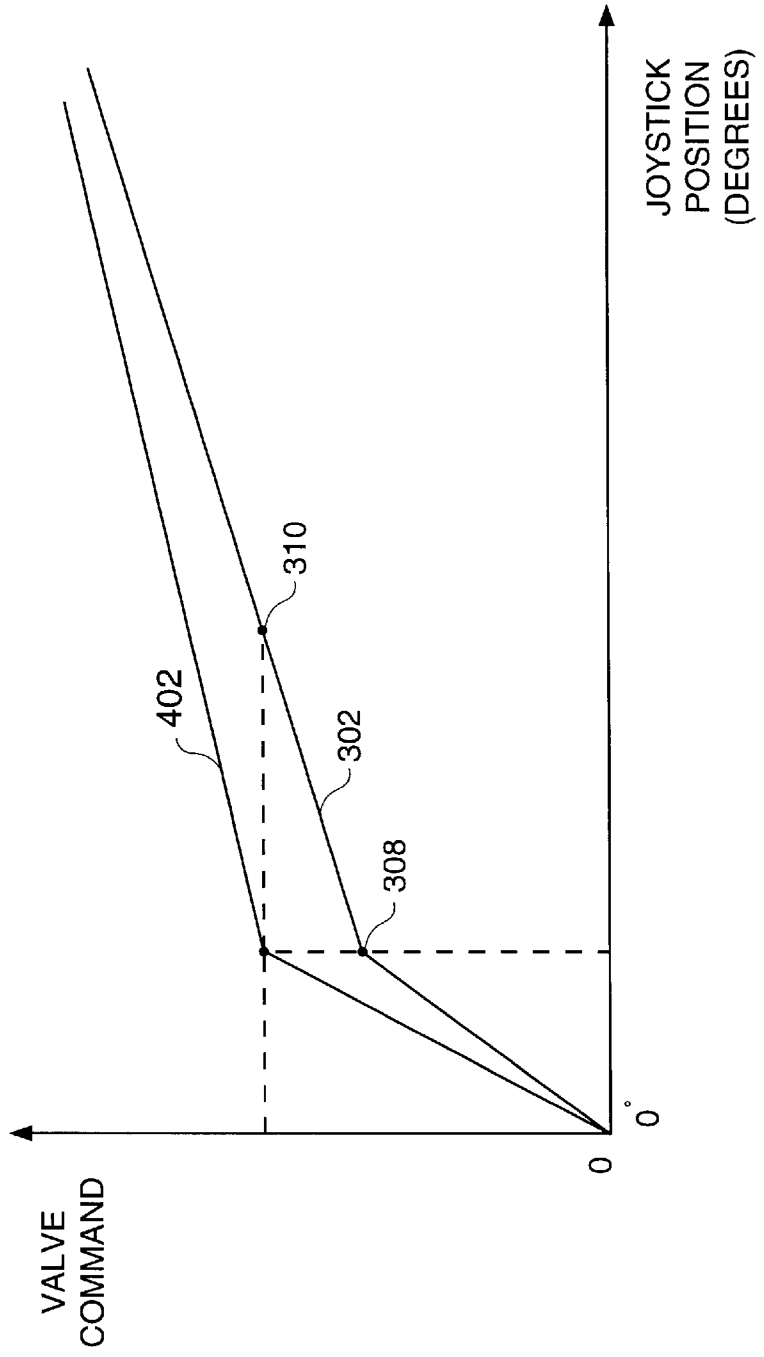
FIG. 4 is a graph of command curve as a function of joystick input, and valve command, for different engine speeds.
Figure 5A:
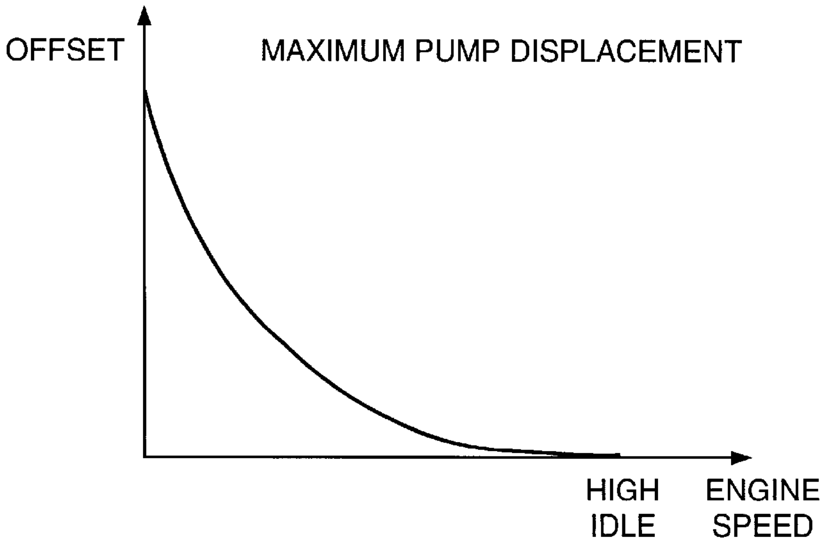
FIG. 5A is a graph of valve command offset as a function of pump displacement and engine speed.
Figure 5B:
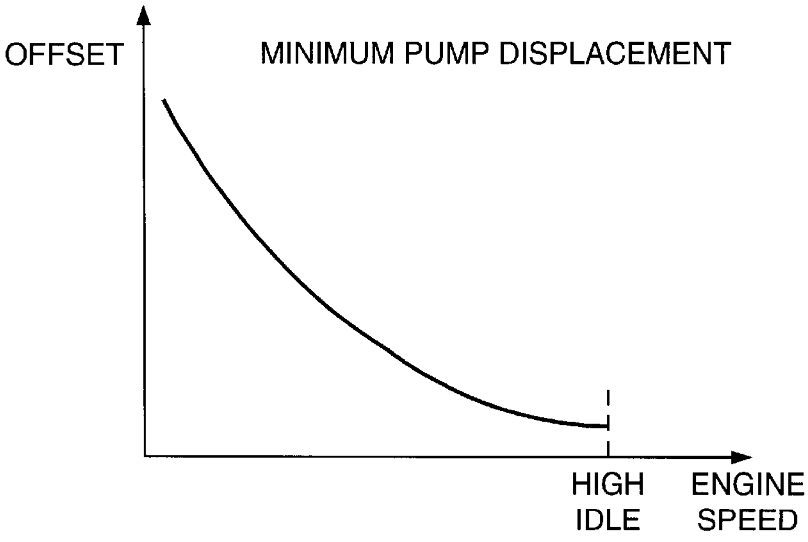
FIG. 5B is a graph of valve command offset as a function of pump displacement and engine speed.
Figure 6:
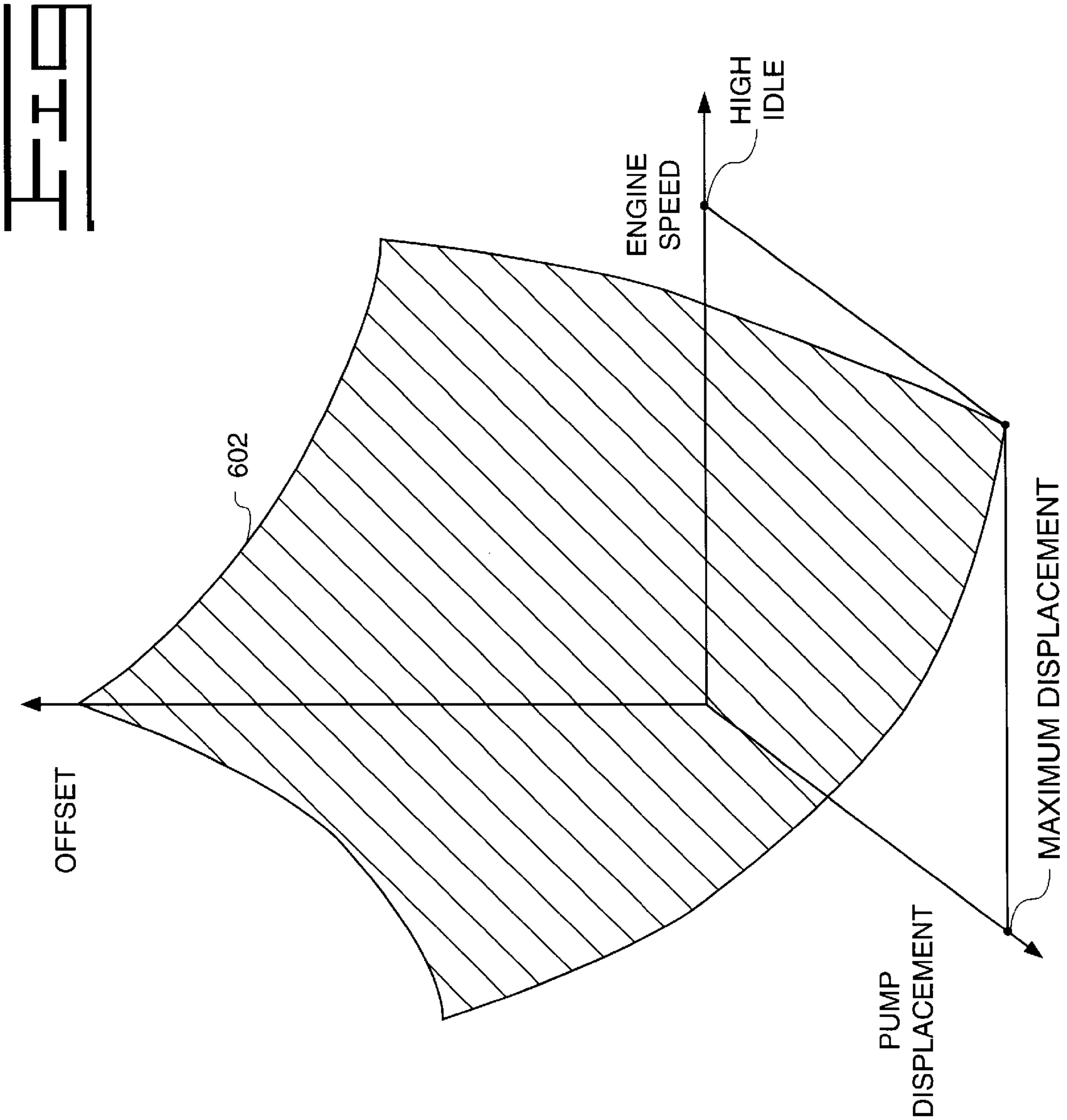
FIG. 6 is a graph of valve command offset as a function of pump displacement and engine speed.

In one embodiment, the appropriate valve command is determined based on the operator input, the engine speed and pump displacement, and the established first motion deadband, or calibrated command curve 302. A command curve, such as the calibrated command curve 302, may be empirically determined for a range of pump engine speeds and pump displacements, such that each curve results in the consistent first motion deadband 308. Command curves may be developed for high idle, medium idle, and low idle engine speeds, and maximum an minimum pump displacements. For example, at maximum pump displacement and a low idle engine speed, a command curve 402 may result in a consistent deadband 308, as illustrated in FIG. 4. These calibrated curves may then be compared to the calibrated command curve 302. A valve command offset may then be determined for each command curve, based on the difference between the calibrated command curve 302 and the determined command curve, such that the first motion deadband of each curve is consistent with the established first motion deadband 308. A valve command offset table may be established and stored for a range of varying engine speeds and pump displacements. Therefore, during the operation of the system 102, to determine an appropriate command curve, the calibrated command curve 302 which was developed at high idle and maximum pump displacement, is accessed to determine a calibrated command. Then a calibrated command offset is determined by determining the actual engine speed and pump displacement, and accessing the appropriate offset from the calibrated offset table. The calibrated offset is then added to the calibrated command, resulting in a valve command which will result in the appropriate valve position when delivered to the valve assembly 120, 122. The determined command valve command will then result in the established first motion deadband, e.g., three degree joystick deadband. For example, FIG. 5A illustrates an valve command offset curve 502 as a function of engine speed, for a maximum pump displacement. FIG. 5B illustrates one example of a valve command offset curve 504, as a function of engine speed, for a minimum pump displacement. In one embodiment, a calibration offset map may be developed for varying engine speed and pump displacement, as illustrated in FIG. 6. The calibrated offset map 602 is one example of an offset map for varying pump speed and displacement.

In an alternative embodiment, a calibration command curve may be empirically established for each engine speed and pump displacement, such that each curve results in the established first motion deadband. During the operation of the machine, the appropriate curve may selected/determined based on the engine speed and pump displacement, and then the appropriate valve command is selected/determined from the appropriate calibrated curve in response to the operator input.

In yet another embodiment, the valve command may be dynamically determined in response to the calibrated response curve 302 and the operator input. That is, instead of using a predetermined command curve for a speed or pump displacement variation, the valve command is dynamically determined using equations established to result in the command curve having the calibrated first motion deadband. For example, a valve command multiplier may be determined, in a manner that the joystick input, or valve command, will be modified, based on a determined flow rate to the cylinder, by a multiplier such that the deadband will occur at a consistent joystick position.

In another embodiment, the command curves and associated offset may be established based upon variations in the flow rate. That is, instead of having a command curve for a particular engine speed and pump displacement, the curve may be based directly on the flow rate. The flow rate may either be calculated based on the engine speed and pump displacement, or a flow sensor 113 may be used to measure the flow directly. Therefore, during the operation of the machine, the flow rate is determined and the appropriate command curve or offset table is selected, based on the flow rate, to determine the appropriate valve command.

In a fifth control block 210, once the valve command is determined, the command is delivered to the valve assembly 120, 122, thereby controlling the operation of the fluid circuit 104.

In another embodiment, calibration offsets may be determined for a particular work function, varying engine speeds and pump displacements. For example, the work functions for an earth moving machine such as a wheel loader may include a blade raise function, blade lower function, rack function, and dump function. Each work function may operate at different circuit conditions, and need different joystick inputs. For example, a raise blade command may need a forward position of the joystick, as opposed to a lower blade command, which may need a backward position of the joystick 28, 30. Therefore, when an operator input is received, the engine speed, pump displacement, and current work function, which are a condition of the hydraulic circuit 104, may be determined. The valve command may then be determined in response to the appropriate calibrated command curve, and calibration offset as described above. Accounting for the work function may also account for the anticipated load experienced by the work implement, and associated actuators. Therefore, in one embodiment, accounting for the work function may increase the accuracy of the resulting first motion deadband.

In another alternative embodiment, a closed center valve (not shown) may be used in the valve assembly 120, 122. Calibration command curves and offset tables analogous to the curves and tables described above, for the embodiment using open centered valves, may be established and used in the same manner to provide a consistent first motion deadband to an operator.

INDUSTRIAL APPLICABILITY

The present invention provides a method and apparatus for controlling a fluid system 102. The fluid system 102 includes a hydraulic circuit 104 having a pump 32 driven by an engine 106. The pump 32 delivers fluid to an actuator 44, 45 through a valve assembly 120, 122. The method includes the steps of receiving an operator input, determining a condition of the hydraulic circuit 104, determining a valve command in response to the fluid condition and the operator input, the valve command resulting in a consistent deadband, and delivering the valve command to the valve assembly 122.

In operation, when an operator commands a work implement to move, by controlling the appropriate joystick 28, 30 for example, the command is received by a controller 22. The controller 22 determines the appropriate valve command in response to the operator input. The valve command is determined by determining a condition of the hydraulic circuit 104, such as the engine speed, pump displacement and current work function of the machine. The operator input and current circuit conditions are used in conjunction with a calibrated command curve to determine a calibrated valve command. In the preferred embodiment, a valve offset table is also accessed to determine a calibrated offset in response to the current joystick input and circuit conditions. The calibrated offset is then added to the calibrated valve command, and the resulting valve command is delivered to the valve assembly 120, 122. The delivered valve command results in a first motion deadband consistent with the established first motion deadband. A consistent first motion deadband will provide a consistent implement control interface for the operator which will result in more efficient machine operation.

Other aspects, objects, and advantages of the present invention can be obtained from a study of the drawings, the disclosure, and the claims.

What is claimed is:

1. a method for controlling a fluid system, the system including a hydraulic circuit having a pump driven by an engine, the pump delivering fluid to an actuator through a valve assembly, comprising:

receiving an operator input;

determining a condition of the hydraulic circuit, said condition including at least one of a fluid flow rate, a pump speed, and a pump displacement;

determining a valve transform function as a function of the condition of the hydraulic circuit;

determining a valve command in response to said valve transform function and said operator input, said valve command resulting in a consistent deadband; and delivering said valve command to the valve assembly.

2. A method, as set forth in claim 1, including the step of establishing a first deadband.

3. A method, as set forth in claim 2, wherein said circuit condition is at least one of an engine speed and a pump displacement.

4. A method, as set forth in claim 3, wherein the step of determining said valve command includes determining said valve command in response to said first deadband, said circuit condition, and said operator input.

5. A method, as set forth in claim 4, including the step of determining a valve command offset in response to a previous circuit condition, said circuit condition, and said first deadband.

6. A method, as set forth in claim 5, wherein said valve command is determined in response to said command offset, said circuit condition, and said operator input.

7. A method, as set forth in claim 6, wherein said consistent deadband is within a predetermined threshold of said first deadband.

8. A method, as set forth in claim 7, wherein said first deadband is established in response to said previous circuit condition, a previous operator input, and a previous valve command.

9. A method, as set forth in claim 8, including the step of determining a work function of the hydraulic circuit, said valve command being determined in response to said operator input, said circuit condition, and said work function.

10. A method, as set forth in claim 9, wherein said consistent deadband is a first motion deadband.

11. A method, as set forth in claim 10, wherein said first motion deadband includes a valve assembly deadband.

12. A method, as set forth in claim 11, wherein said circuit condition includes at least one of a fluid flow rate, a fluid pressure, and a fluid temperature.

13. a method for controlling a fluid system, the system including a hydraulic circuit having a pump driven by an engine, the pump delivering fluid to an actuator through a valve assembly, comprising the steps of:

establishing a first motion deadband;

receiving an operator input;

determining at least one of an engine speed and a pump displacement;

determining a valve transform function as a function said at least one of said engine speed and said pump displacement; and determining a valve command in response to said valve transform function and said operator input, wherein said valve command results in said first motion deadband.

14. A method, as set forth in claim 13, wherein the step of establishing a first motion deadband includes the steps of:

determining at least one of an initial engine speed and a pump displacement;

determining a first operator input;

determining a first valve command in response to said first fluid condition; and wherein said first motion deadband is established in response to said first valve command.

15. an apparatus adapted to control a fluid system, the system including a hydraulic circuit having a pump driven by an engine, the pump delivering fluid to an actuator through a valve assembly, comprising:

an input controller adapted to receive an operator input and responsively generate an input signal;

engine speed sensor adapted to sense a speed of the engine and responsively generate an engine speed signal;

and a controller adapted to receive said input signal and said speed signal, determine a valve transform function in response to said engine speed signal, and to determine a valve command in response to said input signal and said valve transform function, said valve command resulting in a consistent deadband, and to deliver said valve command to the valve assembly.

16. An apparatus, as set forth in claim 15, wherein said controller is further adapted to establish a first motion deadband, and wherein said valve command results in said established first motion deadband.

17. An apparatus for controlling a fluid system, the system including a hydraulic circuit having a pump driven by an engine, the pump operable to deliver fluid to an actuator through a valve assembly, comprising:

means for receiving an operator input;

means for determining a condition of the hydraulic circuit, the condition being indicative of a fluid flow rate of the hydraulic circuit;

means for determining a valve transform function as a function of the condition of the hydraulic circuit;

means for determining a valve command as a function of the valve transform function and the operator input, the valve command operable to cause a consistent deadband; and means for delivering the valve command to the valve assembly.

* * * * *